United States Patent [19]

Von Bergen et al.

[11] Patent Number: 5,209,497

[45] Date of Patent: May 11, 1993

[54] SEALING APPARATUS FOR ROTATING SHAFTS, IN PARTICULAR STERN TUBE SEAL FOR THE PROPELLER SHAFTS OF A SHIP

[75] Inventors: Ernst-Peter Von Bergen, Ahlefeld; Günter Pietsch, Hamburg, both of Fed. Rep. of Germany

[73] Assignee: Blohm+Voss AG, Hamburg, Fed. Rep. of Germany

[21] Appl. No.: 755,001

[22] Filed: Sep. 5, 1991

[30] Foreign Application Priority Data

Sep. 5, 1990 [DE] Fed. Rep. of Germany ....... 4028048

[51] Int. Cl.⁵ .......................... F16J 15/46; F16J 15/34
[52] U.S. Cl. ...................................... 277/28; 277/103; 277/34.3; 277/81 R; 440/112
[58] Field of Search ................. 277/28, 103, 34, 34.3, 277/72 R, 81 R, 935 D, 85, 2, 3, 27; 440/111, 112

[56] References Cited

U.S. PATENT DOCUMENTS

| | | | |
|---|---|---|---|
| 2,153,674 | 4/1939 | Ommundson | 277/34 |
| 2,719,737 | 10/1955 | Fletcher | 277/34.3 |
| 2,943,874 | 7/1960 | Valdi et al. | 277/34.3 |
| 3,088,744 | 5/1963 | Ezekiel et al. | 277/3 |
| 3,529,839 | 9/1970 | Greiner et al. | 440/112 X |
| 3,572,727 | 3/1971 | Greiner | 277/85 X |
| 3,726,531 | 4/1973 | Pagan et al. | 440/112 X |
| 3,770,179 | 11/1973 | McHugh | 277/2 |
| 3,985,365 | 10/1976 | Catanzaro | 277/34 X |
| 4,094,512 | 6/1978 | Back | 277/28 X |
| 4,296,935 | 10/1981 | Inouye | 277/81 R |
| 4,448,425 | 5/1984 | Von Bergen | 277/2 X |
| 4,534,569 | 8/1985 | Ishitani et al. | 277/27 |
| 4,538,820 | 9/1985 | Duffee | 277/81 R X |
| 4,586,719 | 5/1986 | Marsi et al. | 277/81 R X |
| 4,632,403 | 12/1986 | Ishitani et al. | 440/112 X |
| 4,973,065 | 11/1990 | Habich | 277/935 D X |
| 4,984,811 | 1/1991 | Kuwabara et al. | 440/112 X |
| 5,137,116 | 8/1992 | Von Bergen et al. | 277/3 X |

FOREIGN PATENT DOCUMENTS

| | | | |
|---|---|---|---|
| 2639144 | 5/1977 | Fed. Rep. of Germany . | |
| 3819879 | 1/1989 | Fed. Rep. of Germany . | |
| 3220595 | 5/1991 | Fed. Rep. of Germany . | |
| 0600672 | 12/1959 | Italy . | |
| 1378002 | 12/1974 | United Kingdom | 277/85 |
| 2026628 | 2/1980 | United Kingdom | 277/103 |

*Primary Examiner*—William A. Cuchlinski, Jr.
*Assistant Examiner*—Jim Folker
*Attorney, Agent, or Firm*—Nils H. Ljungman and Associates

[57] ABSTRACT

Sealing device for rotating shafts, in particular stern tube seal for the propeller shafts of a ship, with a main seal and a backup seal, in which the main seal is designed as a rotating mechanical seal or as a lip seal, and the backup seal is designed as a gland seal, and the activation of the latter takes place by means of an expandable body, which can be pressurized with a hydraulic or pneumatic pressure medium, preferably as a function of the pressure of the medium to be sealed out.

11 Claims, 5 Drawing Sheets

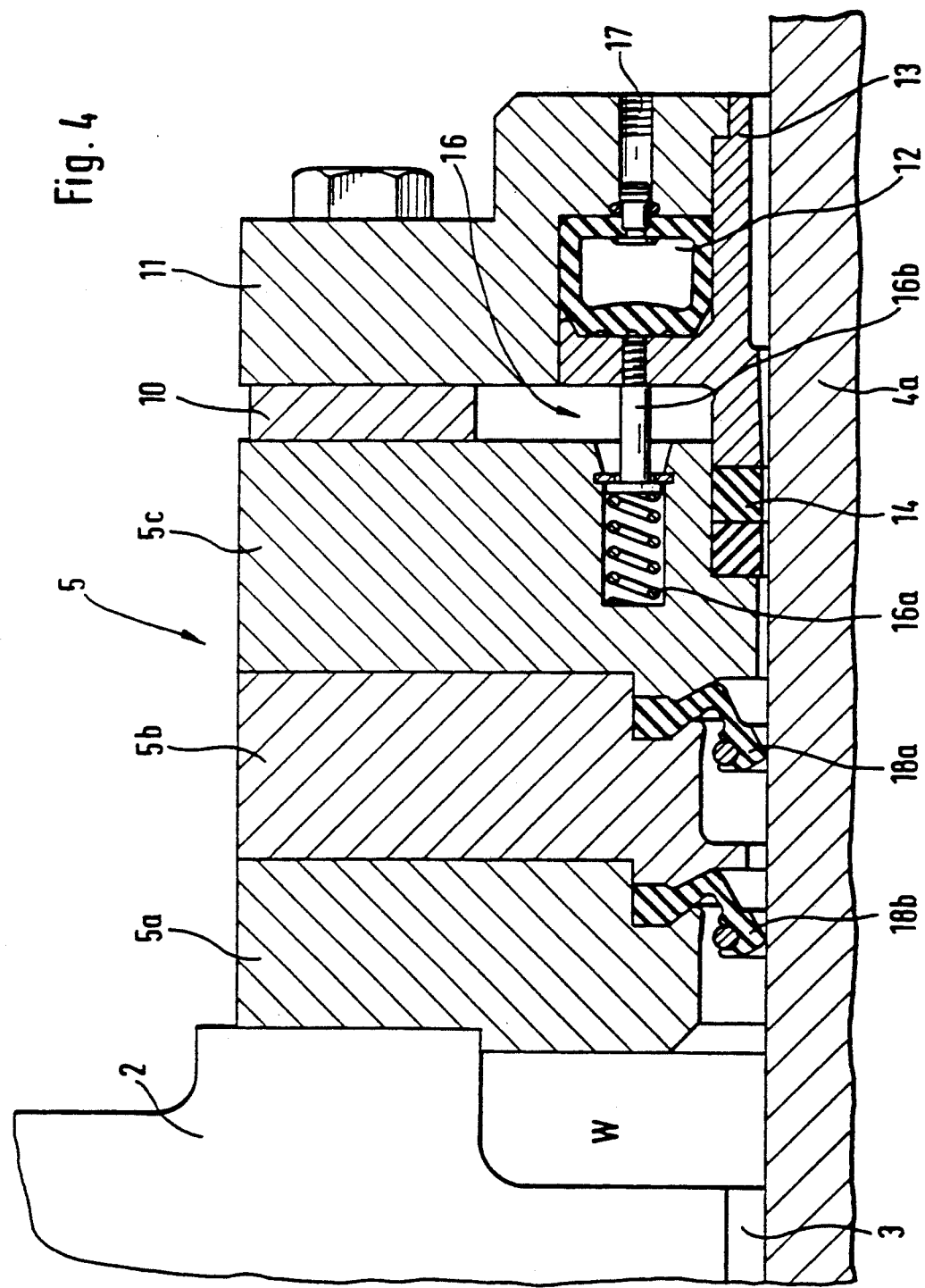

SEALING APPARATUS FOR ROTATING SHAFTS, IN PARTICULAR STERN TUBE SEAL FOR THE PROPELLER SHAFTS OF A SHIP

BACKGROUND OF THE INVENTION

1. Field of the Invention

This invention relates to a sealing apparatus for rotating shafts, in particular a stern tube seal for a ship's propeller shaft, with or without shaft bushings, in particular stern tube seals for a ship's propeller shafts, with or without shaft bushings, with gaskets, preferably a rotating mechanical seal, located in a stationary support system and in sealed contact with the shaft, and with a backup seal located in the support system equipped with a ring-shaped expandable body, into which, in the event of the failure of the main seal, a hydraulic or pneumatic pressure medium can be introduced, which activates the backup seal.

2. Background Information

In the sealing devices of this type as disclosed by Laid Open Federal Republic of Germany Patent Application Number DE 32 20 595 C2, the backup seal is designed as a type of rotating mechanical seal, with two ring-shaped discs rigidly connected to the shaft and at some distance from one another, between which ring-shaped discs there ar two rotatably mounted seal rings, which seal rings are kept at a distance from one another by an elastic ring part having a wedge-shaped cross section.

On the outside of the elastic ring there is a ring-shaped expandable body which, when the backup seal is inactive, is held at a distance from the elastic ring. When the backup seal is activated with pressure outward, the ring-shaped expandable body comes into contact with the elastic ring, and thus presses the seal rings tight against the ring-shaped discs.

Such a sealing device, of course, produces a sufficient sealing effect at relatively low pressures of the medium to be sealed out, but at higher pressures, e.g. those which occur with deep-diving watercraft, the sealing action may no longer be sufficient.

In a similar sealing device for stern tubes of ships disclosed in Laid Open Federal Republic of Germany Patent Application Number 26 39 144, the backup seal is equipped with a ring housing oriented coaxially to the shaft, and which ring housing is mounted on the shaft so that the ring housing can rotate in relation to the shaft, but the ring housing is braked by lip seals so that during normal operation the ring housing rotates along with the shaft. Outside this ring housing, there is a ring-shaped expandable body which, during normal operation, is at some distance from the ring housing, and in the event of a failure of the main seal, the expandable body is pressed tightly against the housing and brings it to a stop. It is apparent that such a backup seal having such a complicated design is not only complex and expensive to manufacture and install, but on account of the different gaps to be sealed, it is also susceptible to leaks at higher pressures of the medium to be sealed out.

OBJECT OF THE INVENTION

The object of the invention is therefore to eliminate these disadvantages of the sealing devices of the prior art, and accordingly to create a sealing device whose backup seal guarantees a reliable seal, even at high pressures of the external medium to be sealed out, and which is economical to manufacture.

SUMMARY OF THE INVENTION

Laid Open Federal Republic of Germany Patent Application Number DE 38 19 879 A1 discloses a sealing device for rotating shafts of ship's propellers, which is designed as a gland seal with soft packings, and a gland which moves in the axial direction in a guide in a stationary support system, whereby the guide and the gland together form a type of piston-cylinder unit, into which a pressure medium can be introduced. But in that device of the prior art, there is no expandable body inside the cylinder, so that the pressure medium acts directly on the gland. It is apparent that at high pressures of the pressure medium, leaks can occur which, when hydraulic oil under pressure is used as the pressure medium, can get into the external environment, which can result in contamination and pollution.

An advantageous configuration of the invention comprises a regulating device, which on the one hand in the event of a failure of the pressure medium and/or of the expandable body, acts as a safety device for the backup seal, and on the other hand during normal operation of the backup seal, the regulation device acts as a setting and adjustment mechanism for the base position of the expandable body, and thus as a calibration apparatus.

An additional advantageous configuration of the invention has a pressure control mechanism, in which there is an automatic control of the application pressure of the gland, as a function of the current pressure of the medium to be sealed out, which is particularly important for submersible watercraft, in which the pressure of the outside water changes rapidly.

In addition to the safety action provided by the backup seal, an additional safety action can be achieved by the activation, as necessary, of a conventional drainage device for leaking fluid. When a maximum leakage occurs the backup seal can be activated.

An additional advantageous configuration of the invention has an elastic restoring device, which returns the gland to the proper position, when there is a reduction in the force acting on the gland, so that when there are fluctuations of the pressure of the medium to be sealed out, there is always a triggering of the backup seal, which thereby prevents the soft packing from burning.

In an additional advantageous configuration of the invention, the backup seal is located in front of the main seal, so that without additional expense for construction, the backup seal is used to seal the shaft when the shaft is at a standstill.

One aspect of the invention resides broadly ia a stern tube seal for a rotating propeller shaft of a ship, the propeller shaft having an axial direction, said stern tube seal comprising: compressible sealing means for sealing around the propeller shaft; a gland member for moving in the axial direction for compressing and decompressing said compressible sealing means to vary sealing; a guide member for directing said gland member in the axial direction; an expandable body located between a portion of said gland member and a portion of said guide member, said expandable body for moving said gland member in the axial direction relative to said guide member for compressing and decompressing said compressible sealing means, said expandable body configured to be activated by a pressurized medium.

Another aspect of the invention resides broadly in a stern tube seal for a rotating propeller shaft of a ship, the propeller shaft having an axial direction, said stern tube seal comprising: a first seal for functioning as a main seal; and a backup seal, said backup seal comprising: compressible sealing means for sealing around the propeller shaft; a gland member for moving in the axial direction for compressing and decompressing said compressible sealing means to vary sealing; a guide member for directing said gland member in the axial direction; an expandable body located between a portion of said gland member and a portion of said guide member, said expandable body for moving said gland member in the axial direction relative to said guide member for compressing and decompressing said compressible sealing means, said expandable body configured to be activated by a pressurized medium.

BRIEF DESCRIPTION OF THE DRAWINGS

The invention is explained below in greater detail, with reference to the accompanying drawings.

FIG. 4 shows an arrangement similar to the one illustrated in FIG. 3 but with the backup seal located behind the main seal.

In all the figures, the same parts are identified by the same reference numbers.

DESCRIPTION OF THE PREFERRED EMBODIMENTS

Figure 1:
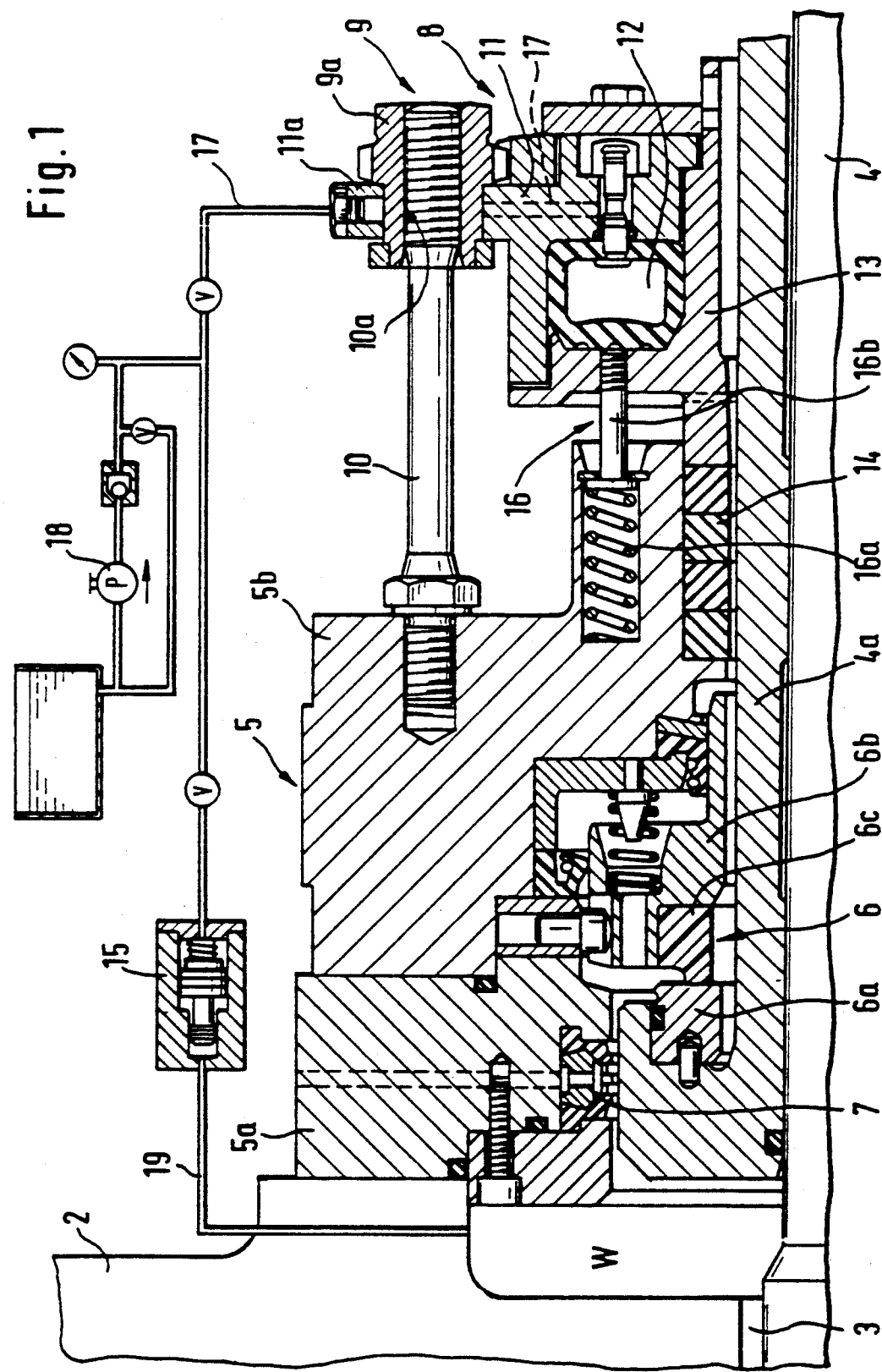
FIG. 1 shows a longitudinal section of a sealing device for the propeller shaft of a ship having a main seal designed as a rotating mechanical seal and a backup seal with a deactivated expandable body.

As shown in FIGS. 1-4, the outside skin of a hull 2 of a ship has a hole 3 for the introduction of the ship's propeller shaft 4 leading from the engine to the propeller, on which propeller shaft 4 a bushing 4a is installed.

To seal the propeller shaft 4 or the bushing 4a against the outside water W, there is a sealing device 5 with a multi-part support system 5a-b (FIGS. 1 and 2) or 5a-c (FIGS. 3 and 4) fastened to the outside skin 2, which support system includes a main seal 6 and a backup seal 8.

Figure 2:
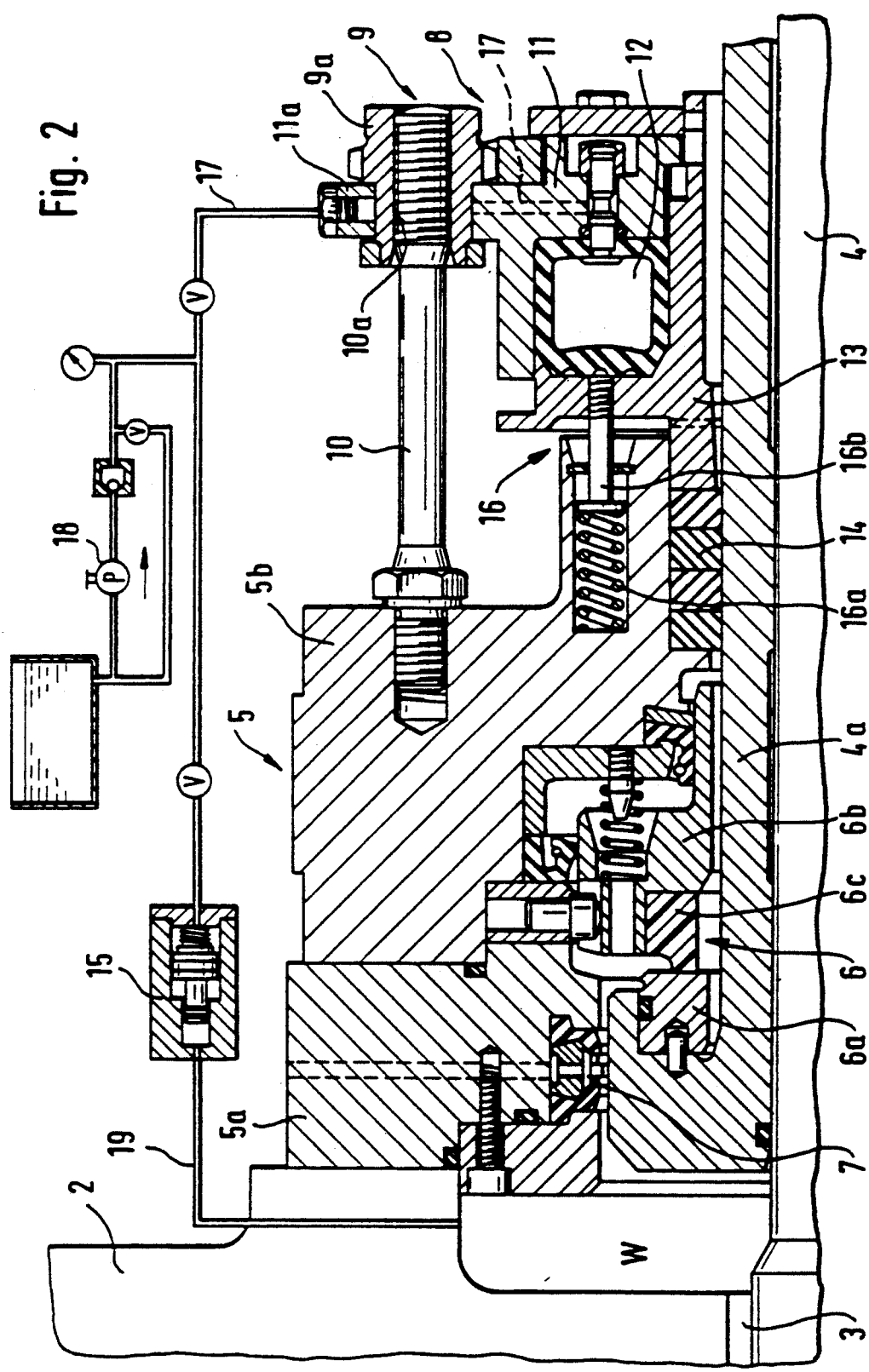
FIG. 2 shows the same arrangement as FIG. 1 with the expandable body activated.

The main seal 6 is designed as a rotating mechanical seal in the variant embodiments in FIGS. 1 and 2, and is accordingly equipped in conventional fashion with a seal ring 6c braced between a ring 6a connected to the bushing and a clamping ring 6b connected to the support system. In addition, in the illustrated embodiment, the main seal 6 is equipped with an expandable, static auxiliary seal 7, which can be activated by a pressure medium as necessary.

Figure 1A:
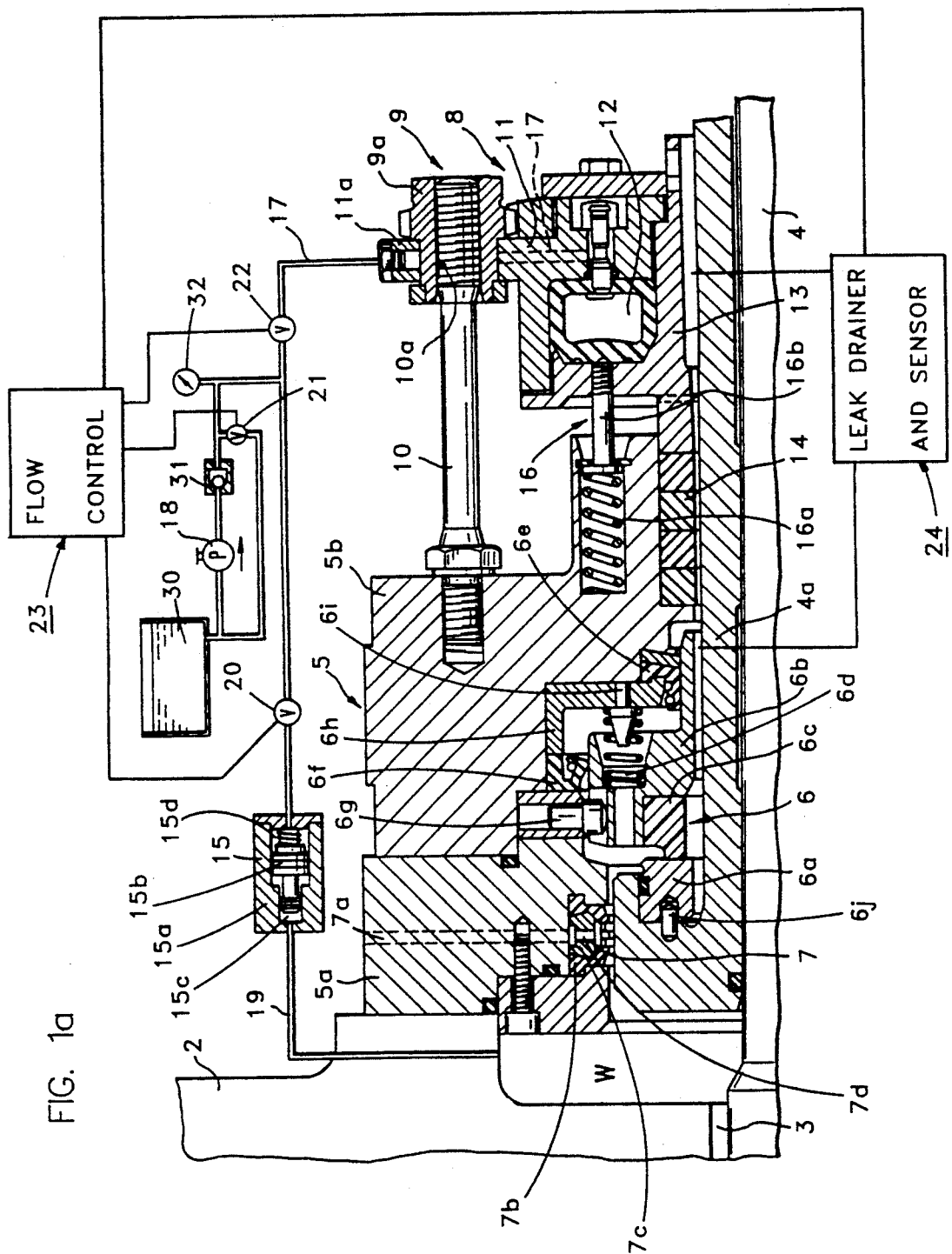
FIG. 1a shows the same arrangement as FIG. 1 with additional components.

FIG. 1a shows main seal 6 in which clamping ring 6b is braced against seal ring 6c by spring 6d, and leakage around clamping ring 6b is prevented by sealing elements 6e and 6f. Spring pin 6i supports spring 6d. Pin 6g secures clamping ring 6b, and pin 6g may be adapted to prevent rotation of clamp ring 6c. Insert 6h supports seal element 6e, seal element 6f, and spring support pin 6i. Pin 6j supports ring 6a on bushing 4a. In addition, FIG. 1a shows auxiliary seal 7 having pressure tube 7a for introducing a pressure medium. Seal elements 7b-d are activated by the pressure medium to seal against bushing 4a.

In the event of a failure of the main seal 6, the backup seal 8 acts as an emergency seal, and is designed as a gland seal with a gland 13 and with soft packings 14. The gland 13 can be moved axially in relation to a ring-shaped guide body 11, which is rigidly connected to the support system 5a, 5b by means of a spacer 10.

Between the gland 13 and the guide body 11, a ring-shaped gap is left open, in which an expandable body 12 is tightly inserted. The expandable body 12 is connected via a pressure line 17 to a pressure source 18 supplying a hydraulic or pneumatic pressure medium. The pressure source 18 may be a hydraulic pump or a pneumatic pump. FIG. 1a shows a reservoir 30 which may contain hydraulic fluid, check-valve 31 which prevents flow of the pressure medium towards the pressure source 18, and gauge 32 for measuring the pressure in the pressure tube system.

The pressure line 17 is also connected to a pressure line 19, which empties into the outside water W and in which there is a pressure control mechanism 15, which operates so that when the pressure of the outside water W increases, the pressure of the pressure medium increases accordingly, and when the pressure of the outside water W decreases, the pressure of the pressure medium decreases. As shown in FIG. 1a, pressure control mechanism 15 may be a piston cylinder arrangement having piston 15b and cylinder 15a. Pressure line 19 communicates with chamber 15c on one side of piston 15b, and pressure line 17 communicates with chamber 15d on the other side of piston 15b. Thus, when the pressure of the water W varies, the piston 15b will shift and change the pressure in the pressure line 17 accordingly.

As shown in FIG. 1a, valves 20, 21, 22 are used to control the pressure of the pressurized medium in pressure line 17. Flow control 23 controls valves 20, 21, 22. Leak drainer and sensor 24 functions to drain outside water W which may leak around main seal 6. When a predetermined maximum leakage occurs, then leak drainer and sensor 24 will activate flow control 23 to increase the pressure of the pressurized medium in pressure line 17. The leak drainer and sensor 24 may comprise tubes which drain away outside water W which has leaked past the main seal 6 and flow meters within the tubes which sense the leakage rate. Alternatively, the leak drainer and sensor 24 may sense leaking water W in the vicinity of bushing 4a. Upon sensing the water W the leak drainer and sensor 24 would then activate flow control 23 to increase the pressure of the pressurized medium in pressure line 17, thus activating the backup seal 8. In addition, a drainage system such as a pump and tubing would be activated to remove the water W which had leaked around main seal 6.

Between the support system 5a, 5b and the gland 13, a restoring device 16 is also inserted, which consists at least of a coil spring 16a and a tappet 16b acting together with it, whereby the coil spring 16a is mounted in the support system 5a, 5b, and the tappet 16b is connected with its free end to the gland 13. The restoring force of the coil spring 16a is designed so that when the pressure of the pressure medium decreases, it always moves the gland 13 in the release direction, and thus reduces the load on its soft packing 14.

There is also a regulating device 9, which is interposed between the guide body 11 and the spacer 10, and which consists of a threaded nut 9a which is mounted so that it can rotate in a recess in the guide body 11, but cannot move axially, and which interacts with a thread 10a on the spacer 10.

This regulating device 9, which can be manually activated, is used on the one hand to protect against leaks in the expandable body 12, or in the event of a failure of the pressure source 18, and on the other hand as a calibration device for the base position of the overall backup seal system 8. That is, the backup seal 8 can be adjusted manually, which allows the adjustment of the gland 13 in the event of expandible body 12 failure such as a leak in the system or failure of pressure source 18.

Figure 3:
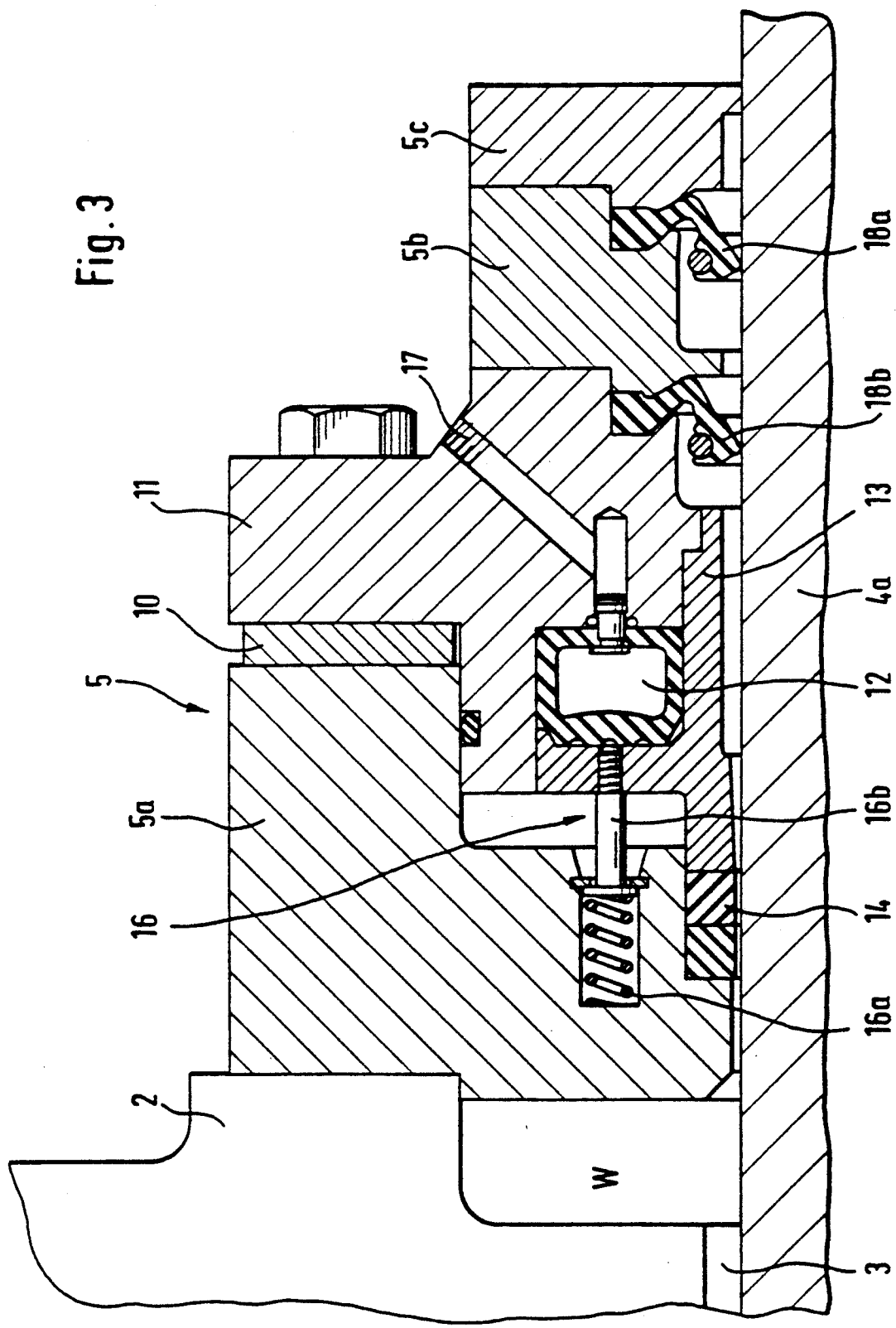
FIG. 3 shows a longitudinal section of an arrangement with the main seal designed as a lip seal and a backup seal located in front of the main seal.

In the variant embodiments illustrated in FIGS. 3 and 4, the main seal is designed as a lip seal, and is accordingly equipped with the conventional seal lips 18a, 18b. In the variant embodiment illustrated in FIG. 3, the lip seal—in relation to the outside water W—is located behind the backup seal, and in the variant illustrated in FIG. 4, the lipseal is located in front of the backup seal.

The regulating device in these variants consists of conventional disc-shaped spacers 10, which can be braced between the ring 5a of the support system and the guide body 11, as shown in FIG. 3, or between the ring 5c of the support system and the guide body 11, as shown in FIG. 4.

In the variant illustrated in FIG. 3, the backup seal, in addition to its basic function as an emergency seal, can also be used as a seal when the shaft is at a standstill, to be able to perform work on the main seal on site, e.g. to change the seal gaskets.

One aspect of the invention resides broadly in a sealing apparatus for rotating shafts, in particular stern tube seals for a ship's propeller shafts, with or without shaft bushings, with gaskets, preferably a rotating mechanical seal, located in a stationary support system and in sealed contact with the shaft, and with a backup seal located in the support system equipped with a ring-shaped expandable body, into which, in the event of the failure of the main seal, a hydraulic or pneumatic pressure medium can be introduced, which activates the backup seal, characterized by the fact that the backup seal 8 is designed as a gland seal with soft packings 14 and a gland 13 which can move in the axial direction in a guide body 11 connected to the support system 5, whereby the guide body 11 and the gland 13 form a type of piston-cylinder unit, in which the expandable body 12 is located, such that it is in tight contact both against the walls of the guide body 11 and against the gland 13.

Another aspect of the invention is a sealing apparatus, characterized by the fact that there is also a regulating device 9 for the manual activation of the gland 13, which has an axially-parallel threaded bolt fastened to the support system 5, and a flange- shaped extension 11a on the guide body 11, whereby the extension 11a has a recess which is coaxial with the threaded bolt 10, in which recess there is a rotatable threaded nut 9a which interacts with the threaded bolt 10, but which cannot move axially in relation to the recess.

Yet another aspect of the invention is a sealing apparatus, characterized by the fact that in the feed line 17 for the pressure medium, there is a pressure control mechanism 15, which is also pressurized by the medium (W) to be sealed out, and which operates so that when the pressure of the medium (W) to be sealed out increases, the pressure of the pressure medium increases, and when the pressure of the medium (W) to be sealed out decreases, the pressure of the pressure medium decreases.

A further aspect of the invention is a sealing device, characterized by the fact that in the presence of a device for the drainage of fluid leaks penetrating the main seal 6, the pressure source 18 of the pressure medium can be activated by means of an automatic flow control when a predetermined maximum leakage occurs.

A yet further aspect of the invention is a sealing device, characterized by the fact that there is an elastic restoring device 16 fastened to the support system 5 and acting constantly on the gland 13 in the sense of the release of the soft packings 14, and the restoring force is designed so that when there is a reduction of the axial force applied by the expandable body 12, or the regulating device 9, it guarantees a release of the gland 13.

Yet another further aspect of the invention is a sealing device, characterized by the fact that the backup seal 8 is located in front of or behind the main seal 6, in relation to the medium to be sealed out.

An additional aspect of the invention is a sealing device, characterized by the fact that when the backup seal 8 is located in front of the main seal 6, it (the backup seal) is designed so that it can also be used to seal the shaft when the shaft is at a standstill for work to be performed in place on the main seal 6, e.g. to replace the gaskets.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof since modifications and variations thereof may be made without departing from the spirit and scope of the invention.

What is claimed is:

1. A stern tube seal for a rotating propeller shaft of a ship, the propeller shaft having an axial direction, said stern tube seal comprising:
    a first seal for functioning as a main seal; and
    a backup seal, said backup seal being for use when said first seal fails, said backup seal comprising:
    compressible sealing means for sealing out an outside medium from around the propeller shaft, the outside medium to be sealed out comprising outside water about the ship at a selected point, the outside water having a variable pressure;
    a gland member for moving in the axial direction for compressing and decompressing said compressible sealing means to vary sealing;
    a guide member for directing said gland member in the axial direction;
    an expandable body located between a portion of said gland member and a portion of said guide member, said expandable body for moving said gland member in the axial direction relative to said guide member for compressing and decompressing said compressible sealing means;
a pressurized medium for acting upon said expandable body;
a pressure control mechanism comprising:
sensing means for sensing the pressure of said variable water pressure at said selected point;
means for varying the pressure of said pressurized medium; and
said pressured control mechanism for increasing and decreasing the pressurized medium directly in relation to at least the pressure of the outside water at said selected point and wherein a portion of said gland member telescopes into said guide member to form a piston-cylinder unit; and said expandable body is always completely contained within said piston-cylinder unit.

2. The stern tube seal of claim 1, comprising:
a support body including a portion of the stern tube seal;
said guide member having flange-shaped extension; and
connecting means being connected between said flange-shaped extension and said support body, said connecting means additionally for moving said guide member and said gland member in an axial direction.

3. The stern tube seal of claim 2, comprising:
a pressure line for conducting the pressurized medium, said pressure line being connected to said expandable body; and
said pressure control mechanism means being connected between said pressure line and said outside water to be sealed out.

4. The stern tube seal of claim 3, comprising:
automatic flow control means for activating the pressurized medium; and
means for sensing and draining leaks, which leaks being of the outside water to be sealed out which outside water to be sealed out has penetrated the main seal;
said means for sensing and draining leaks for activating said automatic flow control means to increase the pressure of the pressurized medium when a predetermined maximum leakage occurs.

5. The stern tube seal of claim 4, comprising elastic restoring means for moving said gland in an axial direction to decompress said compressible sealing means when at least one of:
the pressure of the pressurized medium is decreased; and
said connecting means moves said guide means to decompress said compressible sealing means.

6. The stern tube seal of claim 5, wherein said backup seal is located in one of:
in front of said main seal in relation to the medium to be sealed out; and
behind said main seal in relation to the medium to be sealed out.

7. The stern tube seal of claim 6, wherein said backup seal is located in front of said main seal in relation to the medium to be sealed out, and said backup seal is configured to be activated when the propeller shaft is not moving.

8. The stern tube seal of claim 7, wherein:
said compressible sealing means comprises a plurality of soft packings;
said expandable body is ring-shaped;
said pressurized medium is one of a pneumatic pressurized medium and a hydraulic pressurized medium;
said flange-shaped member having a recess, said recess being connected to said connecting means;
said connecting means comprises a threaded bolt member being connected between said recess of said flange-shaped extension and said support body, said threaded bolt member being axially-parallel to the propeller shaft, and said connecting means comprises a threaded nut cooperating with said threaded bolt member and said recess, said threaded nut connecting said threaded bolt member to said flange-shaped extension and for moving said guide means and said gland member in an axial direction;
said elastic restoring means connects between said gland member and said support body;
said elastic restoring means comprises a spring member and a tappet member;
the propeller shaft comprises a bushing; and
said first seal comprises a rotating mechanical seal.

9. The stern tube seal of claim 8, wherein said rotating mechanical seal comprises:
a seal ring for sealing out the medium to be sealed out;
a ring connected to the bushing for rotating with the bushing;
a clamping ring connected to said support body;
said ring connected to the bushing and said clamping ring for bracing said seal ring therebetween, for sealing between said seal ring and each of said clamping ring and said ring connected to the bushing;
a first seal spring for biasing said seal ring between said ring connected to the bushing and said clamping ring, said first seal spring being connected between said clamping ring and said support body;
a first seal pin for connecting said clamping ring to said support body, said pin being configured to prevent rotation of said clamping ring and to permit movement of said clamping ring in the axial direction; and
a plurality of clamping ring seals for sealing between said clamping ring and said support body.

10. The stern tube seal of claim 9, wherein:
said pressure control mechanism means comprises a piston-cylinder arrangement.

11. The stern tube seal of claim 10, further comprising:
an auxiliary seal for sealing around the propeller shaft, said auxiliary seal being between the medium to be sealed out and both said first seal and said backup seal;
said auxiliary seal being configured to be activated by a pressurized medium.

* * * * *